(12) United States Patent
Shaked et al.

(10) Patent No.: US 11,995,193 B1
(45) Date of Patent: *May 28, 2024

(54) ARCHITECTURE OF A MULTI-CLOUD INSPECTOR FOR ANY COMPUTE TYPE

(71) Applicant: Wiz, Inc., New York, NY (US)

(72) Inventors: Yaniv Shaked, Tel Aviv (IL); Ami Luttwak, Binyamina (IL); Gal Kozoshnik, Petah Tikva (IL); Roy Reznik, Tel Aviv (IL); Yarin Miran, Rishon Lezion (IL)

(73) Assignee: WIZ, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/477,179

(22) Filed: Sep. 28, 2023

Related U.S. Application Data

(63) Continuation of application No. 17/653,325, filed on Mar. 3, 2022.

(60) Provisional application No. 63/156,754, filed on Mar. 4, 2021.

(51) Int. Cl.
| | |
|---|---|
| *H04L 29/06* | (2006.01) |
| *G06F 9/455* | (2018.01) |
| *G06F 9/50* | (2006.01) |
| *G06F 16/28* | (2019.01) |
| *G06F 21/57* | (2013.01) |

(52) U.S. Cl.
CPC ........ *G06F 21/577* (2013.01); *G06F 9/45558* (2013.01); *G06F 9/5072* (2013.01); *G06F 9/5077* (2013.01); *G06F 16/288* (2019.01); *G06F 2009/4557* (2013.01); *G06F 2009/45587* (2013.01); *G06F 2009/45595* (2013.01)

(58) Field of Classification Search
CPC .. G06F 21/577; G06F 16/288; G06F 9/45558; G06F 9/5072; G06F 9/5077; G06F 2009/4557; G06F 2009/45587; G06F 2009/45595
See application file for complete search history.

(56) References Cited

U.S. PATENT DOCUMENTS

| | | |
|---|---|---|
| 1,062,837 A | 5/1913 | Mertz |
| 8,595,822 B2 | 11/2013 | Schrecker et al. |
| 9,438,634 B1 | 9/2016 | Ross et al. |
| 9,594,881 B2 | 3/2017 | Bhargava et al. |
| 9,756,065 B2 * | 9/2017 | Keohane ............... G06F 9/5077 |
| 9,916,321 B2 | 3/2018 | Sundaram et al. |
| 9,940,330 B2 | 4/2018 | Le et al. |
| 10,110,636 B2 | 10/2018 | Ross et al. |
| 10,157,276 B2 | 12/2018 | Schilling et al. |
| 10,320,813 B1 | 6/2019 | Ahmed et al. |
| 10,649,863 B2 | 5/2020 | Kumarasamy et al. |

(Continued)

FOREIGN PATENT DOCUMENTS

| | | |
|---|---|---|
| WO | 2018033375 A2 | 2/2018 |

*Primary Examiner* — Tri M Tran
(74) *Attorney, Agent, or Firm* — M&B IP Analysts, LLC

(57) ABSTRACT

An architecture of a multi-cloud inspector for any computing device type is provided. According to an embodiment, a method for implementing multi-cloud inspection includes accessing an object list, determining which objects to inspect, determining which inspectors to use, creating object copies, providing and running inspectors for each object copy, receiving inspection report summaries, generating an enriched dataset, and adding the enriched dataset to a security graph database.

19 Claims, 4 Drawing Sheets

(56) References Cited

U.S. PATENT DOCUMENTS

| | | | |
|---|---|---|---|
| 11,216,563 B1 * | 1/2022 | Veselov | ............... H04L 63/1408 |
| 11,409,611 B2 | 8/2022 | Sancheti | |
| 11,431,735 B2 | 8/2022 | Shua | |
| 2013/0219050 A1 | 8/2013 | Park et al. | |
| 2021/0263802 A1 | 8/2021 | Gottemukkula et al. | |
| 2021/0303685 A1 | 9/2021 | Klonowski et al. | |
| 2023/0011004 A1 * | 1/2023 | Fellows | ................... G06F 21/53 |

\* cited by examiner

ARCHITECTURE OF A MULTI-CLOUD INSPECTOR FOR ANY COMPUTE TYPE

CROSS-REFERENCE TO RELATED APPLICATIONS

This application is a continuation of U.S. Non-Provisional patent application Ser. No. 17/653,325 filed Mar. 3, 2022, which itself claims the benefit of U.S. Provisional Application No. 63/156,754 filed on Mar. 4, 2021, all contents of which are hereby incorporated by reference.

TECHNICAL FIELD

The present disclosure relates generally to cybersecurity and, in particular, to architectures of multi-cloud inspection for any type of compute.

BACKGROUND

As organizations, such as businesses, governments, and the like, expand the implementation of computer systems to improve operations, such organizations may include, within the organizations' computing systems, various cloud services and platforms, such as those provided by, or included in, Microsoft® Azure, Amazon® Web Service (AWS), and the like. Such cloud services and platforms, including services, applications, platforms, and the like, may include various sub-devices, sub-systems, and the like, where the various included devices and systems, which may be interconnected, including via multi-cloud connections, cross-cloud connections, and the like, may be configured to provide various functionalities, to simulate or emulate various physical systems and devices, and the like. The systems and devices which make up an organization's computing ecosystem may include various vulnerabilities, exposures, misconfigurations, and similar cybersecurity threats, where such threats may present security risks to an organization.

As an organization's computing ecosystem may be large, complex, or otherwise difficult to manually analyze, such organizations may seek solutions providing automated analysis of connected devices, systems, platforms, environments, and the like. Such solutions, such as those currently available, may provide for the identification of computing devices and components, the identification of connections between such devices and components, and the like. Further, certain currently-available solutions may also provide for the execution of various security processes, such as scanning processes, across such networks, platforms, and environments. However, while certain currently-available solutions may provide for the identification of interconnected devices and systems, as well as the scanning thereof, such solutions may require outlays of time, cost, or effort, which may render the application of such solutions unappealing to network administrators seeking fast, accurate, and low-cost detection of network vulnerabilities across various cloud architectures and compute types.

Specifically, as organizational systems, networks, and environments may be large and may include large numbers of devices, including devices of various types and functionalities, implementation of currently-available vulnerability scanning and network management solutions may require large investments of time, effort, and expense. As an example, where a network administrator wishes to scan all the virtual machines (VMs) included in an international e-commerce company's systems, such a scan, using presently-available scanning solutions, may require the collection of large volumes of data, including collection from servers and other resources located in other parts of the world, where implementing such a scan may require a large time investment to collect and scan the relevant data and a large effort investment to manage the scanning project. In addition, copying a large disk of a computing machine over a network is not feasible.

For example, if a machine is executed in a cloud located in Europe, copying such a disk of a machine to a location in the west coast of the United States, and performing timely scans, is not feasible. For example, a typical size of a computing device's disk is hundreds of gigabytes.

Furthermore, all these operations would need to be performed for each cloud computing environment (i.e., for Azure®, for AWS, etc.) and as such would dramatically increase the complexity of performing such actions.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for multi-cloud vulnerability inspection. The method comprises: accessing an object list, including a plurality of objects, each object having a corresponding identifier, each object deployed in a cloud environment, wherein a first object is deployed in a first cloud environment and a second object is deployed in a second cloud environment; determining at least a first inspector for inspecting at least a portion of the plurality of objects from the object list; generating an object copy for each of the at least a portion of the plurality of objects, the object copy including a virtual environment, wherein the at least a first inspector is deployed in the virtual environment; receiving an inspection report from the at least a first inspector in response to inspecting the object copy; generating an enriched dataset based on the inspection report; and storing at least a portion of the enriched dataset in a security graph.

Certain embodiments disclosed herein also include a non-transitory computer readable medium having stored thereon causing a processing circuitry to execute a process, the process comprising: accessing an object list, including a plurality of objects, each object having a corresponding identifier, each object deployed in a cloud environment, wherein a first object is deployed in a first cloud environment and a second object is deployed in a second cloud environment; determining at least a first inspector for inspecting at least a portion of the plurality of objects from the object list; generating an object copy for each of the at least a portion of the plurality of objects, the object copy including a virtual environment, wherein the at least a first inspector is deployed in the virtual environment; receiving an inspection report from the at least a first inspector in response to inspecting the object copy; generating an enriched dataset based on the inspection report; and storing at least a portion of the enriched dataset in a security graph.

Certain embodiments disclosed herein also include a system for multi-cloud vulnerability inspection. The system comprises: a processing circuitry; and a memory, the memory containing instructions that, when executed by the processing circuitry, configure the system to: access an object list, including a plurality of objects, each object having a corresponding identifier, each object deployed in a cloud environment, wherein a first object is deployed in a first cloud environment and a second object is deployed in a second cloud environment; determine at least a first inspector for inspecting at least a portion of the plurality of objects from the object list; generate an object copy for each of the at least a portion of the plurality of objects, the object copy including a virtual environment, wherein the at least a first inspector is deployed in the virtual environment; receive an inspection report from the at least a first inspector in response to inspecting the object copy; generate an enriched dataset based on the inspection report; and store at least a portion of the enriched dataset in a security graph.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
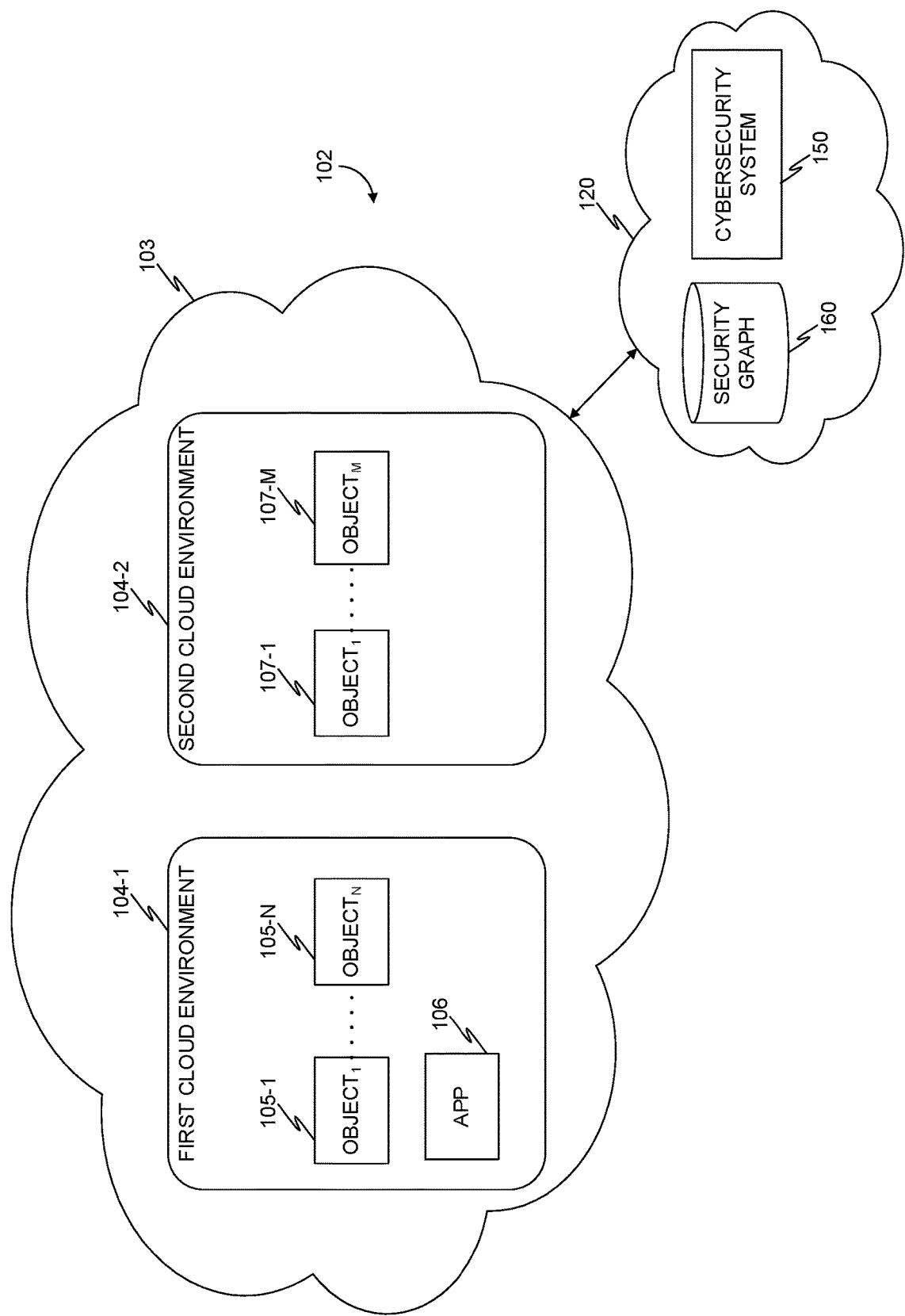
FIG. 1 is a diagram of a cloud inspection architecture, utilized to describe the various embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

A multi-cloud inspection system includes an inspection environment having a security graph representing therein a plurality of objects from a plurality of different cloud environments. Each cloud environment may be implemented on top of a different cloud infrastructure. A cybersecurity system accesses an object list, which may include objects from each cloud environment, in order to determine which objects to inspect for security risks and vulnerabilities. Inspector workloads are determined to inspect each object. In an embodiment an inspector may be determined based on the object type. An object copy is generated for an inspector to inspect. In an embodiment an inspector application may be executed on the object copy.

FIG. 1 is an example diagram of a cloud inspection architecture 102, utilized to describe the various embodiments. A cloud infrastructure 103 may be a computing environment of a cloud computing service provider, such as Amazon® Web Service (AWS), Microsoft® Azure, Google® Cloud Platform (GCP), and the like. The cloud infrastructure 103 may host (i.e. provide services to) a plurality of cloud environments, such as first cloud environment 104-1 and second cloud environment 104-2. A cloud environment may be, for example, a virtual private cloud (VPC).

A cloud environment represents an organization's cloud-based resources, and the various connections between such resources. For example, the first cloud environment 104-1 may include multiple objects, 105-1 through 105-N(hereinafter, "objects" 105 or "object" 105), where 'NI' is an integer having a value of '2' or greater. The first cloud environment 104-1 may further include at least an application, such as application 106.

Each cloud environment may be configured to connect, for example via a network, to a remote inspection environment 120. The remote inspection environment includes a cybersecurity system 150 discussed in more detail below.

Further, it may be understood that, while a single configuration of a cloud infrastructure 103 is shown for purposes of simplicity, an organization's computing environment may include various combinations of cloud infrastructure, cloud environments, objects, applications, and the like, as well as any combination thereof, without loss of generality or departure from the scope of the disclosure. For example, an organization's computing environment may include a first plurality of VPCs implemented on top of AWS, each VPC including a plurality of objects, applications, and combinations thereof, and a second plurality of VPCs implemented on top of GCP. Further, it may be similarly understood that multiple cloud environments 104 may be simultaneously relevant to the processes and features described herein, including, without limitation, multiple interconnected cloud environments, without loss of generality or departure from the scope of the disclosure.

A cloud environment 104 may include, without limitation, container orchestration or management systems or platforms such as, for example, a Kubernetes® deployment, a virtual machine hypervisor, such as vSpheres®, or a serverless function, such as Lambda®.

A cloud environment, such as second cloud environment 104-2 may be implemented as a physical network of discrete, interconnected objects, as a virtual network, providing for interconnection of various virtual systems and devices, and as a hybrid physical-virtual network, including both physical and virtualized components. In an embodiment, a primary cloud environment 104 may include one or more subnets. Each subnet may be configured to serve as a secondary cloud environment for the various objects which may be included in the subnet, while retaining the connectivity and functionalities provided by the primary cloud environment 104.

Objects 105-1 through 105-N, and objects 107-1 through 107-M of the first cloud environment 104-1 and the second cloud environment 104-2, respectively, are objects, systems, devices, components, applications, entities, and the like, configured to operate within the cloud environment 104 and provide various functionalities therein. For example, objects may include one or more object types, including, without limitation, network objects, computing objects, and the like, as well as any combination thereof.

Network objects are objects configured to provide one or more of traffic-management, identity management, authentication, and communication functionalities within a network. Examples of network objects include, without limitation, proxies, load balancers, firewalls, and the like. Further, computing objects are objects configured to provide one or more data processing or management functionalities. Examples of computing objects include, without limitation, databases, fileservers, dedicated processing hardware, and the like. Specifically, the objects may be objects configured to send, receive, or both send and receive, network data. The objects 105 may be configured to connect with various other objects 105, various external objects, and the like, as well as any combination thereof, for purposes including, without limitation, sending data, receiving data, monitoring data transmissions, monitoring network status and activity, and the like, as well as any combination thereof.

The network objects may be configured to include one or more communication ports, where the included communication ports provide for connection of various objects according to one or more protocols, and at different communication layers of the OSI model.

In an example configuration, the objects 105 are virtual entities or instances of systems, devices, components, and the like, as well as any combination thereof. Examples of objects 105 include, without limitation, virtual networks, firewalls, network interface cards, proxies, gateways, containers, container management objects, virtual machines, subnets, hubs, virtual private networks (VPNs), and the like, as well as any combination thereof. Such objects are related to resources, i.e. resources of a cloud environment. Other objects, such as user accounts, service accounts, and roles, are related to principals, which are cloud entities that act on cloud resources.

As another example, an object may be a virtual machine, a container, or a serverless function. An object may include storage, such as a disk of a virtual machine, a persistent volume assigned to a container, or a bucket for a serverless function.

The applications 106, as may be hosted, executed, and the like, as well as any combination thereof, in one or more cloud environments 104, are services, processes, and the like, configured to provide one or more functionalities by execution of various commands and instructions. The applications 106 may interact or communicate with other objects, applications, and other, like features, including those objects, applications, and the like deployed in separate networks, cloud environments, and the like, as well as any combination thereof.

It should be understood that a single application, including the same application, may be both present and executed in multiple cloud environments 104, including multiple cloud environments 104 of the same cloud infrastructure 103, without loss of generality or departure from the scope of the disclosure.

The inspection environment 120, in an embodiment, includes the cybersecurity system 150 and the graph database (DB) 160. The inspection environment 120 may be physically separated from the cloud environment 104-1 (or 104-2) or may be co-located (i.e., share a cloud infrastructure, such as GCP) with the cloud environment 104-1 (or 104-2). The inspection environment 120 may be configured to provide, by operation of the included cybersecurity system 150, as described hereinbelow, one or more functionalities including, without limitation, remote inspection of objects 105 or objects 107 included in the cloud environment 104-1 and 104-2 respectively, remote collection of cloud environment object 105 (or object 107) data, and the like, as well as any combination thereof.

A network, or other communication system, may provide for the connection for each of the cloud environments, and their various components and sub-parts, with the elements of the inspection environment 120, including the cybersecurity system 150, the security graph DB 160, as well as other, like, systems, devices, and components, and any combination thereof. The network may be implemented as a physical network of discrete systems, devices, components, objects, and the like, as a virtual network, providing for interconnection of various virtual systems and devices, as well as a hybrid physical-virtual network, including both physical and virtualized components. The network may be, as examples, and without limitation, a local area network, a wide area network, the Internet, the World-Wide Web (WWW), and the like, as well as any combination thereof.

The cybersecurity system 150 is configured to provide one or more inspection functionalities including, without limitation, remote object inspection. The cybersecurity system 150 may be configured as a physical system, device, or component, as a virtual system, device, or component, or as a hybrid physical-virtual configuration. A detailed description of a cybersecurity system, 150, according to an embodiment, is provided with respect to FIG. 4, below. It may be understood that, while the cybersecurity system 150 is depicted in FIG. 1 as an element of the inspection environment 120, the cybersecurity system 150 may be included within any of the various elements of the network architecture, including the cloud infrastructure 103, the various cloud environments 104-1 and 104-2, as well as subparts thereof, and the like, without loss of generality or departure from the scope of the disclosure.

The security graph is stored in a graph database (DB) 160. The graph database 160 includes a storage or memory component, device, system, or the like, configured to provide one or more functionalities relevant to storage of graph-related data. The security graph 160 may be configured to store graph-related data features of one or more types or formats, including, without limitation, raw data, graphs, graph edges, graph vertices, graph schemas, and the like, as well as any combination thereof, including those types or formats described hereinbelow.

Security graphs, as may be stored in the graph DB 160, include a data structures including a plurality of nodes, each node connected one or more graph vertices, where such graph vertices may be variously interconnected to at least another node.

A security graph, stored in the graph DB 160, may be configured to provide for one or more representations of various data sets, including, without limitation, presentation of network data according to one or more graph schemas, as described hereinbelow. As an example, a security graph representing a collection of interconnected objects (such as objects 105 and objects 107 of FIG. 1 above) may include one or more graph nodes, where each graph node corresponds to an object, and graph edges between such nodes, the edges corresponding with connections between the various objects.

The graph DB 160 may be configured to store one or more graphs, graph-related data features, and the like, as well as any combination thereof. Graphs, as may be stored in the graph DB 160, may be configured to include one or more functional attributes, including, without limitation, directionality, labeling, and the like, where such functional attributes may provide for the execution or enhancement of one or more processes or methods which would be inapplicable to a graph not including such functional attributes.

A security graph, stored in the graph DB 160, including directionality may be configured to include connections between graph nodes or vertices, via graph edges, as described herein, where the edges connecting such vertices may be uni-directional or bi-directional, providing for enhanced analysis of network object structures and relationships. Further, a security graph configured to include labeling functionality may be configured to provide for the labeling of graph nodes, graph edges, or both, with one or more labels describing the various properties of the labeled nodes or edges. As an example, a graph node representing a virtual machine (VM) may be configured to include a "name" label, describing a name property (i.e., attribute) of the VM. Further, the VM may be configured to run a container entity, where the container entity, as represented in the graph, may be respectively labeled. Thus, the security graph will include a first node representing the VM, a second node representing the container, and an edge connecting the first node to the second node to indicate that the object represented by the second node is contained in the object represented by the first node.

In addition, according to the same example, the connection, or edge, between the vertices representing the VM and the container entity may be uni-directional and may be labeled as a "run" edge, providing for analysis of the relationship between the vertices, the direction of the relationship, and the type of the relationship.

The graph DB 160 may further include a user interface for providing queries to the security graph 160. The queries may be executed on the graph, to detect, for example, nodes which include attributes having a certain value.

The graph DB 160 may be configured as a physical system, device, or component, as a virtual system, device, or component, or in a hybrid physical-virtual configuration. It may be understood that, while the security graph DB 160 is depicted in FIG. 1 as an element of the inspection environment 120, the graph DB 160 may be included within any of the various elements of the network architecture, including the various cloud environments 104, and subparts thereof, and the like, without loss of generality or departure from the scope of the disclosure. Further, it may be understood that the graph DB 160 may be directly connected to, or realized as, a component of, the cybersecurity system 150, without loss of generality or departure from the scope of the disclosure.

Figure 2:
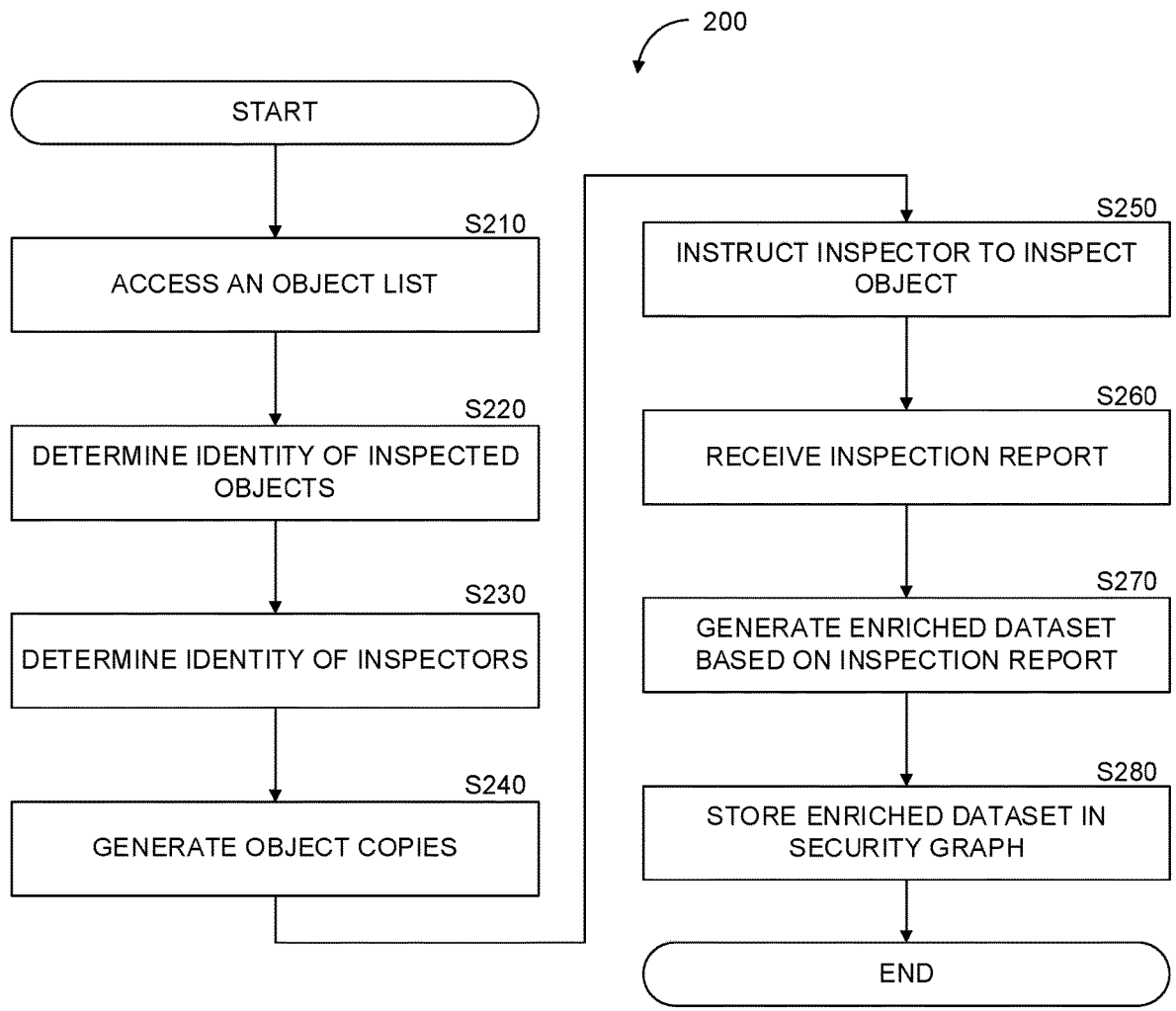
FIG. 2 is a flowchart depicting a method for executing an inspection process, according to an embodiment.

FIG. 2 is an example flowchart 200 depicting a method for executing an inspection process, according to an embodiment.

At S210, an object list is accessed. An object list is a list of objects included in one or more target cloud environments, such as cloud environments similar or identical to the cloud environments 104, of FIG. 1, above. Similarly, the objects or entities included in the object list may be entities similar or identical to those objects or entities described with respect to FIG. 1, above, such as objects 105 and objects 107. Object lists may be accessed by one or more processes including, without limitation, collection from memory or storage, collection from an orchestrator or supervisor, receipt from process outputs or returns, other, like, processes, and any combination thereof.

Where accessing an object list includes collection from memory or storage, such collection may include, without limitation, collecting, receiving, or otherwise accessing one or more object lists from various memory or storage components, devices, systems, and the like, which may be configured to store such lists, and the like, as well as any combination thereof. Further, such collection from memory or storage may include collection from one or more memory or storage components, devices, systems, or the like, which may be configured to store graphs and graph-related data features, such as, as an example and without limitation, the security graph DB, 160, of FIG. 1, above.

In addition, where accessing an object list includes collection from an orchestrator or supervisor, such collection may include collecting, receiving, or otherwise accessing one or more object lists from various orchestrator or supervisor components, devices, systems, or the like, where such orchestrators or supervisors may be configured to generate, store, or both generate and store, object lists corresponding to the platform, environment, network, or the like, in which the relevant orchestrator or supervisor is implemented.

Further, where accessing an object list includes receipt of an object list from process outputs or returns, accessing, at S210, may include collecting, receiving, or otherwise accessing one or more object lists included in the data flows of one or more processes configured to generate, store, modify, or otherwise interact with such lists. In an example, accessing an object list by receipt of an object list from process outputs or returns may include collecting one or more object lists from the output data stream of a process configured to generate such lists. In certain embodiments an object list may be implemented as a table, for example where a first column represents an object name, a second column represents an object network identifier (e.g., IP address), and a third column indicates if the object should be inspected.

At S220, the identities of objects to be inspected are determined. The determination of the identities of objects to be inspected includes the identification, within the object list or lists accessed at S210, of one or more objects relevant to various inspection criteria. An object identity may be based on an identifier, such as an object type (e.g. VM, user account, application, etc.). In another embodiment, the object identity may be based on a unique identifier, such as an IP address, a name in a namespace, and the like. Inspection criteria which may be relevant to the determination, at S220, of the identities of one or more objects to be inspected include, without limitation, object types, object functionalities, object sensitivity descriptions, and the like, as well as any combination thereof.

As a first example, type matching may include matching of one or more specified types, such as, as examples, all virtual machines (VMs) in the list, all proxy objects in the list, and the like. Further, in a second example, where determination of objects to be inspected includes determination based on object functionalities, determination, at S220, may include identifying all objects, in the accessed object list or lists, which include a functionality matching one or more specified functionalities, such as, as an example, all included databases, fileservers, and other storage components, as may relate to a specification providing for selection of objects with a "storage" functionality. As a third example, where determination of objects to be inspected includes determination based on object sensitivity descriptions, determination, at S220, may include identifying all objects, in the accessed object list or lists, which include a sensitivity label or tag matching a specified sensitivity label or tag, such as, as an example, all objects including a "sensitive object" label.

According to further examples, identification of objects to be inspected may include, without limitation, identification of objects reporting short periods of activity, such as where such objects may be excepted from a list of objects to be inspected, identification of objects which are image containers, such as where image containers may be excepted from a list of objects to be inspected, identification of objects which are not susceptible to exploitation, such as where such objects may be excepted from a list of objects to be inspected, and the like.

In certain embodiments, a security graph may be traversed or queried to generate the object list. For example, the security graph may be provided with a query which when executed provides an output including a list of all objects represented in the security graph which match predicates of the query. The output may include an object name, and a corresponding object network address. An inspector workload may then access the object via the object network address in order to perform inspection.

At S230, the identities of inspectors to use are determined. An inspector, as described further hereinbelow, is a process, application, program, or the like, configured to provide one or more inspection functionalities by execution of various commands, instructions, or the like, across an entity or object. As an example, a vulnerability inspector may be an inspector configured to compare a hash of a file included in an object's storage with a hash of a file included in a vulnerability database, providing for the detection of a vulnerability where the stored file is found to match the vulnerability database file.

The identities of applicable inspectors may be determined according to one or more criteria, where the one or more criteria are relevant to the properties of the objects identified at S220. Criteria applicable to the identification of applicable inspectors include, without limitation, the types of objects to be inspected, the names of files included in the objects to be inspected, the names of directories included in objects to be inspected, and the like, as well as any combination thereof. Further, S230 may include the determination that one or more inspectors, which may be designated as "standard," may be used with respect to the objects identified at S220.

Where determination of inspector identities includes determination based on the types of objects identified at S220, determination may include identification of one or more applicable inspectors based on the object type of each object included in the set identified at S220. Type-based inspector identification may include, without limitation, identification of one or more inspectors as applicable to a given object based on one or more pre-defined or user-defined inspector associations, where such inspector associations may specify one or more inspectors applicable to a given object type.

As an example, a pre-defined inspector association may specify that three different inspectors are applicable to objects of a "database" type. According to the same example, where one or more objects identified at S220 are database-type objects, determination at S230 may include determination that the three specified inspectors are applicable to such database objects.

Where determination of inspector identities includes determination based on the names or identities of files or directories included in the objects to be inspected, various inspectors may be determined to be applicable based on comparison of a given file or directory name with a pre-defined or user-defined inspector association dictionary, or the like, where such a dictionary may be configured to specify one or more inspectors applicable to a given file or directory name.

As a first example, where a file included in a VM is an executable file included as part of an operating system, and where the file has a standard name or identity, specified by the operating system across all deployments, such as "OSUserInterface.exe," comparison of the file's name or identity with the association dictionary, where the dictionary specifies relevance of a "version control" inspector to such files, may include determination that, based on the file's name and the dictionary's specification, a "version control" inspector is applicable to the specific file.

Further, as a second example, where a directory included in a software repository is a package, the package including all executables, resources, and the like, needed to implement a specific version of a program, determination of inspector identities may include comparison of the directory with the association dictionary by comparing the package name or identity with package names or identities included in the dictionary and, where a match is detected, identifying one or more applicable inspectors based on a specification included in the dictionary.

In addition, determination of which inspectors to apply, as at S230, may include the determination to apply one or more standard inspectors to the relevant objects identified at S220. The one or more standard inspectors may be inspectors which are pre-determined, user-determined, or otherwise-determined to be applicable to all objects.

Examples of standard inspectors, which may be, at every execution of S230, determined to be applicable, include, without limitation, vulnerability inspectors, such as those inspectors directed to the detection of various vulnerabilities, secrets inspectors, such as those inspectors directed to the detection of various sensitive or secret data features, and the like, as well as any combination thereof. As an example, where a vulnerability inspector and a secrets inspector are pre-determined to be applicable to all objects, execution of S230 may include the determination that a vulnerability inspector and a secrets inspector, in addition to other, like, inspectors, are to be implemented.

At S240, object copies are created. Object copies are images, direct copies, disk snapshots, or other, like, representations of the objects identified at S220, configured to provide for the subsequent execution of inspection processes, as described hereinbelow, across the identified objects, without accessing, modifying, or otherwise interacting with the original objects identified at S220. Such execution of inspection processes over object copies may provide for various functionalities including, without limitation, inspection of objects which may be in-use, and for which execution of an inspection process over the original object would cause undesirable interference with object operations, as well as other, like, functionalities, and any combination thereof.

Object copies may be, without limitation, one-to-one representations of the original objects, such as object copies which are exact duplicates of the original objects, abbreviated, or otherwise incomplete representations of the original objects, such as a snapshot, or a copy of a single disk included in a multi-disk storage component, where only the given disk is relevant to the inspection process, other, like, representations, and any combination thereof.

Further, the object copies may be created in, or at, one or more physical or virtual locations or addresses, such as within the cloud environment or virtual private cloud (VPC) in which the corresponding original object is located. Such physical or virtual co-location of object copies and original objects may provide for the execution of inspection processes, across object copies, within the original object's native environment, providing for execution of such inspection processes without the requirement that data be transmitted outside the environment, where such external transmission may be expensive, time-consuming, unsecured, and the like.

Object copying, such as at S240, as well as subsequent return of inspection report summaries, is illustrated, according to an example, with respect to FIG. 3, below.

At S250, instructions are provided to each identified inspector to inspect at least an object. Inspection instructions may include commands, resources, and other, like, data features, necessary to implement the one or more inspectors identified at S230. Inspector instructions may include, without limitation, compiled code, applications, resource files, and the like, as well as any combination thereof.

In certain embodiments such inspector instructions, when implemented on the object copy relative to which the inspector instructions are provided, may configure the object copy or copies to execute or implement the relevant inspector(s), where such execution or implementation is described hereinbelow.

Following the provision of inspector instructions respective of the object copies at S250, an inspector may be provisioned to inspect at least an object copy. Provisioning an inspector may include, for example, provisioning a node in a container implemented in the inspection environment and associating the node with the object (e.g., assigning a persistent volume claim to a disk of the copied object) to be inspected.

In certain embodiments, an inspector may be executed on the object copy, where the object copy includes an environment in which executable code pertaining to the inspector can be executed. In such embodiments the inspector code is run on an object copy instance of each object determined to be inspected. The relevant object copy instances are inspected using the one or more inspector types determined for each object. Each inspector generates a summary of the respective inspection. Such a summary may include the type of the computing object corresponding to the relevant graph node, a summary of the object's disk contents, programming language libraries, identified on-disk secrets, OS packages, installed versions, registry values, and any other details related to inspection, as well as any combination thereof.

At S260, inspection report summaries are received by the cybersecurity system. In another embodiment, the summaries are pulled from the inspectors. In an embodiment, a report summary includes an indicator indicating that a vulnerability, exposure, threat, or a combination thereof has been detected on, or respective of, an object.

At S270, an enriched dataset is generated. An enriched dataset is a data feature describing one or more aspects of the objects inspected, as well as vulnerabilities relevant thereto. An enriched dataset, including such vulnerability descriptions, may be designated as a risk profile. A risk profile is a collection of descriptions relevant to one or more inspected objects, as well as various platforms, environments, networks, and the like, where the descriptions included in the risk profile may be configured to provide information relevant to the security risks of the associated objects.

Relevant security risk information, as may be included in a risk profile, may be, as examples and without limitation, lists of vulnerabilities included in a given object, lists of secrets included in a given object, other, like, security risk information, as may be included in the various inspection report summaries received at S260, and the like, as well as any combination thereof.

An enriched dataset may be generated in one or more formats including, without limitation, tables, lists, and other, like collections of information, graph overlays or layers, such as graph-correspondent data features which provide representations of enriched data relevant to the elements of a graph, other, like, formats, and any combination thereof.

At S280, the enriched dataset is added to a graph database. The enriched dataset may be added to a graph database, such as the graph DB, 160, of FIG. 1, above, by updating various features of the security graph stored therein to include the enriched data generated at S270. Updating the security graph to include such enriched data may include, without limitation, updating one or more security graphs, or other, like, records of elements (e.g., nodes) included in a security graph, to include generated enriched data relevant to each graph element, storing one or more graph layers or overlays to the graph database, adding other, like, enriched data features to the graph database, and the like, as well as any combination thereof.

As a first example, adding the enriched dataset to the security graph may include updating a graph stored in the graph database 160 to include descriptions of each vulnerability identified in each relevant object, such as by updating the corresponding graph nodes to include the relevant information. A node attribute may be updated with a value from the generated enriched dataset. Further, as a second example, where generating an enriched dataset at S270 includes generating a graph overlay, the generated graph overlay may be, at S280, saved to the graph database. As a third example, an enrichment may be stored as a node in a graph, and linked (e.g., by an edge) to one or more other nodes in the security graph which pertain to the enrichment.

The enrichment may be, for example, a node representing a vulnerability, and connecting a node representing a VM to the vulnerability node indicates that the VM includes the vulnerability. While storing enrichment data in this manner may increase the number of nodes, it decreases the relative size of each node, and removes duplicate data, as each node which includes the vulnerability is no longer required to store information about the vulnerability, but rather only store an edge to the vulnerability node, resulting in a more compact graph.

Figure 3:
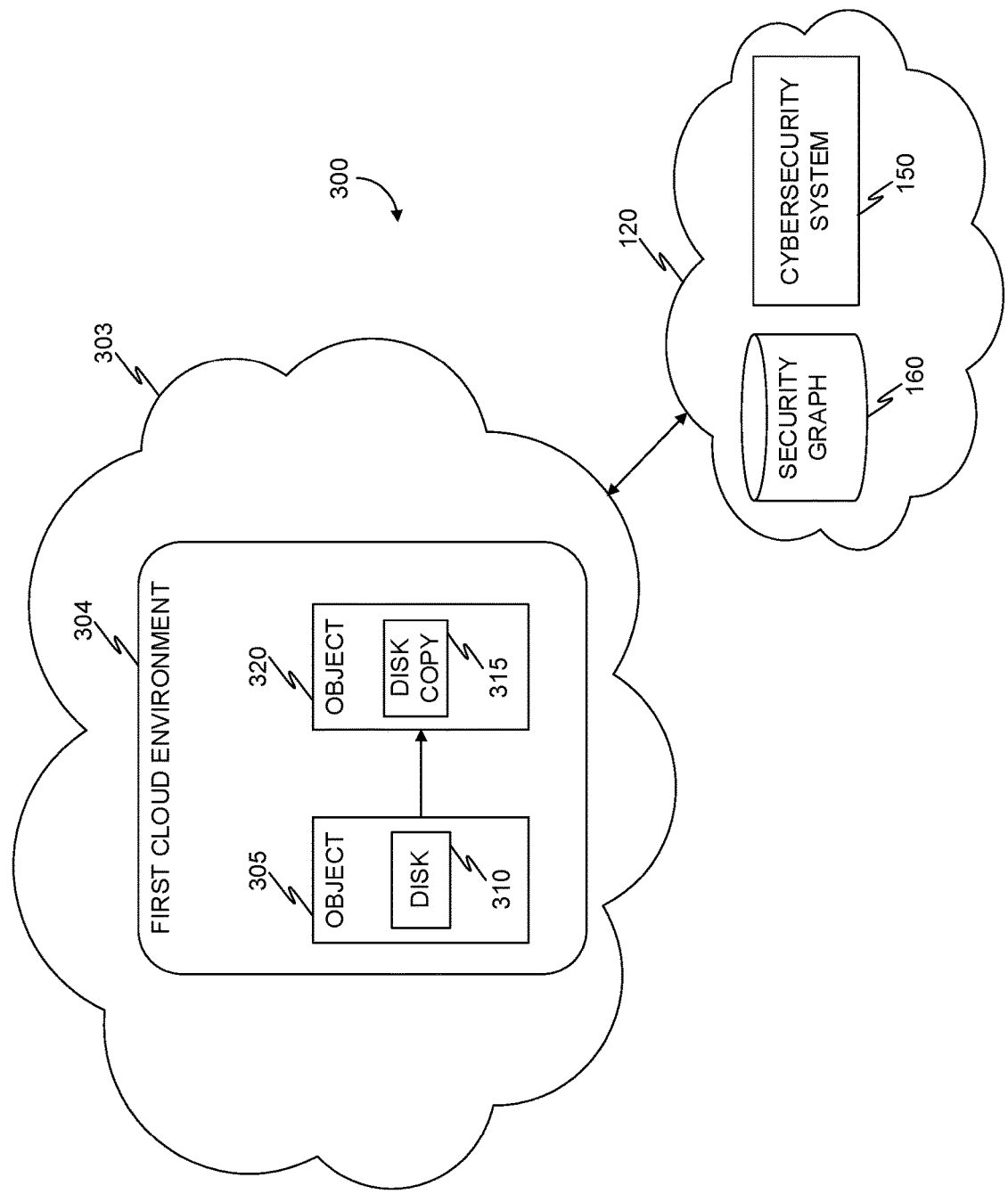
FIG. 3 is an example illustration of a relationship between an object, a corresponding object copy, and a cybersecurity system, according to an embodiment.

FIG. 3 is an example illustration 300 of a relationship between an object 305, a corresponding object copy 320, and a cybersecurity system 150, according to an embodiment. In the illustration 300, the object 305 is shown to include a disk 310, representing the data stored on or in the object 305. In addition, the corresponding object instance (or copy) 320 is shown to include a disk copy 315.

During the execution of object copying and inspection report transmission, as described hereinabove, an object 105 is first copied, within the object's native environment, to provide a localized object instance 320. The copying process may include disk duplication, by which process a copy of the disk 310 included in the object 305 may be included, as a disk copy 315, in the object instance 320. As an example of such a copying process, a first virtual machine (VM) including a storage may be so copied. During the copying process, a copy of the VM may be generated within the cloud environment 304 (corresponding for example to the cloud environments 104 of FIG. 1 above) which includes the object. The cloud environment 304 is implemented within a cloud infrastructure 303. Further, during the same process, a copy of the VM's storage may be created within the generated VM copy. In this example the first VM would be the first object 305, while another VM, which is not the first VM, would be the object instance 320.

In certain embodiments, the object instance 320 may include only a portion of the elements of the object 305. For example, the object instance 320 may be a snapshot of the disk 310. A disk copy 315 may be a mounted snapshot, for example.

In addition, where an object instance 320 has been generated, one or more inspectors, as described herein, may be executed on, in, or with respect to, the object copy. Each of the inspectors, as described, may be configured to generate, during operation, one or more inspection report summaries, where such inspection report summaries may be provided to the cybersecurity system 150 as described. The cybersecurity 150 is implemented, together with a security graph DB 160 in an inspection environment 120 which is communicatively coupled with the first cloud environment 304, for example by utilizing the network of the cloud infrastructure 303.

Figure 4:
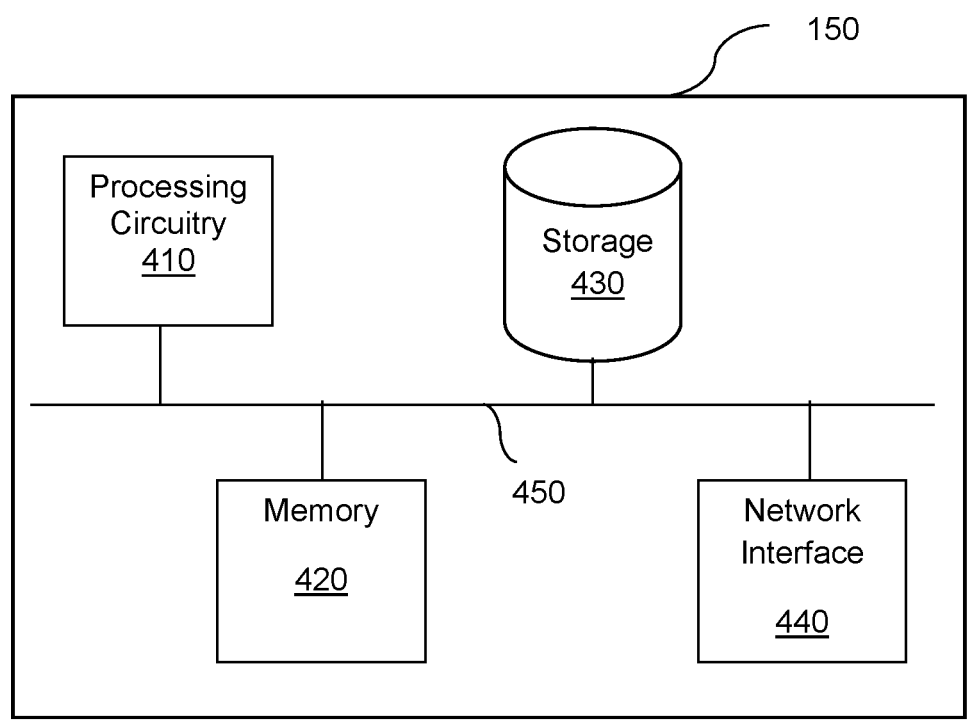
FIG. 4 is a hardware block diagram depicting a cybersecurity system, according to an embodiment.

FIG. 4 is an example hardware block diagram 400 depicting a cybersecurity system 150, according to an embodiment. The cybersecurity system 150 includes a processing circuitry 410 coupled to a memory 420, a storage 430, and a network interface 440. In an embodiment, the components of the cybersecurity system 150 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 420 may be volatile (e.g., random access memory, etc.), non-volatile (e.g., read only memory, flash memory, etc.), or a combination thereof.

In one configuration, software for implementing one or more embodiments disclosed herein may be stored in the storage 430. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 430 may be magnetic storage, optical storage, and the like, and may be realized, for example, as flash memory or another memory technology, or any other medium which can be used to store the desired information.

The network interface 440 allows the cybersecurity system 150 to communicate with the various components, devices, and systems described herein for multi-cloud inspection, such as inspectors, objects, as well as other, like, purposes.

It should be understood that the embodiments described herein are not limited to the specific architecture illustrated in FIG. 4, and other architectures may be equally used without departing from the scope of the disclosed embodiments.

It should be noted that the computer-readable instructions may be construed broadly to mean any type of instructions, whether referred to as software, firmware, middleware, microcode, hardware description language, or otherwise. Instructions may include code, such as in source code format, binary code format, executable code format, or any other suitable format of code. The instructions, when executed by the circuitry, cause the circuitry to perform the various processes described herein.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units (CPUs), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform, such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for remote inspection of a cloud computing environment for a cybersecurity object, comprising:
   accessing a first cloud computing environment, the first cloud computing environment including a plurality of workloads;
   generating a copy from a workload of the plurality of workloads in a second cloud computing environment;
   selecting an inspector based on an identity of the inspector, the identity corresponding to a cybersecurity object;
   initiating inspection for the cybersecurity object in the copy of the workload by the inspector;
   detecting the cybersecurity object in the copy of the workload;

sending an identifier of the detected cybersecurity object and an identifier of the workload to an inspection environment, wherein the inspection environment is configured to store the identifier of the detected cybersecurity object and the identifier of the workload in a security database;

detecting the cybersecurity object in a copy of a second workload of the plurality of workloads;

performing a graph-based analysis to generate an enriched dataset based on the cybersecurity object;

generating in the inspection environment: a representation of the cybersecurity object, a representation of the workload, and a representation of the second workload;

connecting in the security database the representation of the cybersecurity object, based on the graph-based analysis, to: the representation of the workload and the representation of the second workload; and using a result of the graph-based analysis to detect a vulnerability in the workload.

2. The method of claim 1, wherein the copy of the workload is co-located with the workload.

3. The method of claim 1, further comprising:
remotely collecting cybersecurity data from the second cloud computing environment to the inspection environment.

4. The method of claim 1, further comprising:
generating the copy based on a clone of the workload.

5. The method of claim 1, wherein inspection of a cybersecurity object of a copy of a co-located workload within an original workload's runtime environment does not require external data transfer.

6. The method of claim 1, wherein an inspector performing an inspection of a cybersecurity object is of one or more types determined to be compatible with the cybersecurity object.

7. The method of claim 1, further comprising:
generating a summary of a result of an inspection for each inspector for each object copy inspected.

8. The method of claim 7, further comprising: sending the result to a cybersecurity system contained in the inspection environment.

9. The method of claim 7, further comprising: pulling the result directly from an inspector.

10. A non-transitory computer-readable medium storing a set of instructions for remote inspection of a cloud computing environment for a cybersecurity object, the set of instructions comprising:
one or more instructions that, when executed by one or more processors of a device, cause the device to:
access a first cloud computing environment, the first cloud computing environment including a plurality of workloads;
generate a copy from a workload of the plurality of workloads in a second cloud computing environment;
select an inspector based on an identity of the inspector, the identity corresponding to a cybersecurity object;
initiate inspection for the cybersecurity object in the copy of the workload by the inspector;
detect the cybersecurity object in the copy of the workload;
send an identifier of the detected cybersecurity object and an identifier of the workload to an inspection environment, wherein the inspection environment is configured to store the identifier of the detected cybersecurity object and the identifier of the workload in a security database;
detect the cybersecurity object in a copy of a second workload of the plurality of workloads;
perform a graph-based analysis to generate an enriched dataset based on the cybersecurity object;
generate in the inspection environment: a representation of the cybersecurity object, a representation of the workload, and a representation of the second workload;
connect in the security database the representation of the cybersecurity object, based on the graph-based analysis, to: the representation of the workload and the representation of the second workload; and
use a result of the graph-based analysis to detect a vulnerability in the workload.

11. A system for remote inspection of a cloud computing environment for a cybersecurity object comprising:
a processing circuitry; and
a memory, the memory containing instructions that, when executed by the processing circuitry, configure the system to:
access a first cloud computing environment, the first cloud computing environment including a plurality of workloads;
generate a copy from a workload of the plurality of workloads in a second cloud computing environment;
select an inspector based on an identity of the inspector, the identity corresponding to a cybersecurity object;
initiate inspection for the cybersecurity object in the copy of the workload by the inspector;
detect the cybersecurity object in the copy of the workload;
send an identifier of the detected cybersecurity object and an identifier of the workload to an inspection environment, wherein the inspection environment is configured to store the identifier of the detected cybersecurity object and the identifier of the workload in a security database;
detect the cybersecurity object in a copy of a second workload of the plurality of workloads;
perform a graph-based analysis to generate an enriched dataset based on the cybersecurity object;
generate in the inspection environment: a representation of the cybersecurity object, a representation of the workload, and a representation of the second workload;
connect in the security database the representation of the cybersecurity object, based on the graph-based analysis, to: the representation of the workload and the representation of the second workload; and
use a result of the graph-based analysis to detect a vulnerability in the workload.

12. The system of claim 11, wherein the copy of the workload is co-located with the workload.

13. The system of claim 11, wherein the memory contains further instructions which when executed by the processing circuitry further configure the system to:
remotely collect cybersecurity data from the second cloud computing environment to the inspection environment.

14. The system of claim 11, wherein the memory contains further instructions which when executed by the processing circuitry further configure the system to:
generate the copy based on a clone of the workload.

15. The system of claim 11, wherein inspection of a cybersecurity object of a copy of a co-located workload within an original workload's runtime environment does not require external data transfer.

16. The system of claim 11, wherein an inspector performing an inspection of a cybersecurity object is of one or more types determined to be compatible with the cybersecurity object.

17. The system of claim 11, wherein the memory contains further instructions which when executed by the processing circuitry further configure the system to:
   generate a summary of a result of an inspection for each inspector for each object copy inspected.

18. The system of claim 17, wherein the memory contains further instructions which when executed by the processing circuitry further configure the system to:
   send the result to a cybersecurity system contained in the inspection environment.

19. The system of claim 17, wherein the memory contains further instructions which when executed by the processing circuitry further configure the system to:
   pull the result directly from an inspector.

* * * * *